May 24, 1960     J. M. SWARTZENTRUBER     2,937,400
DEHIDER
Filed Oct. 27, 1958
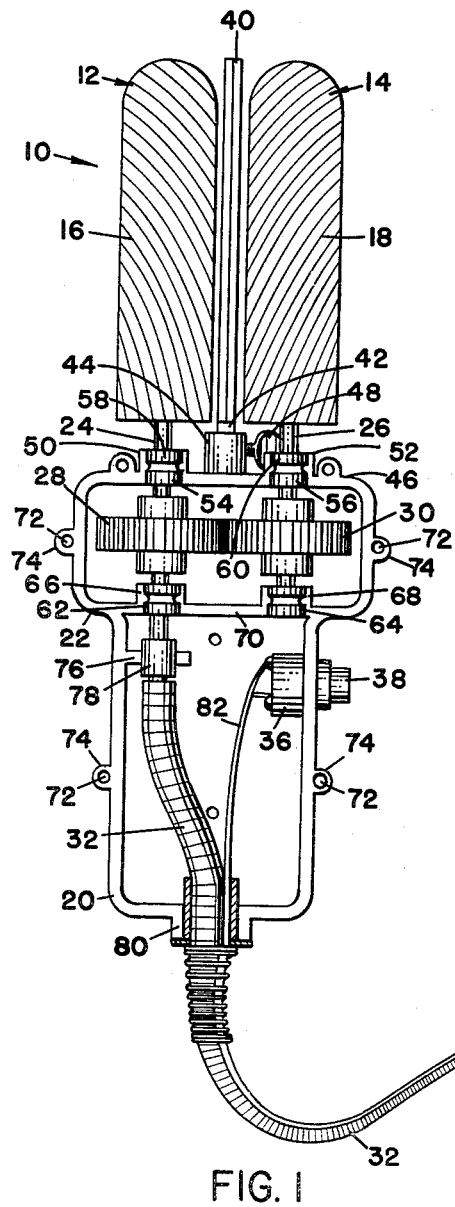
FIG. 1
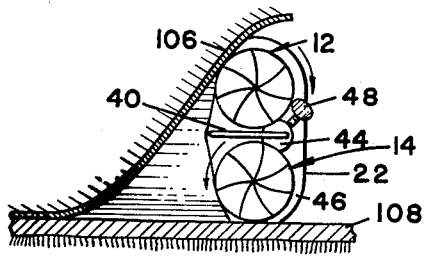
FIG. 2
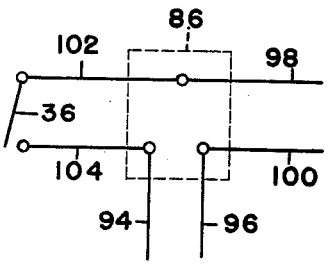
FIG. 3
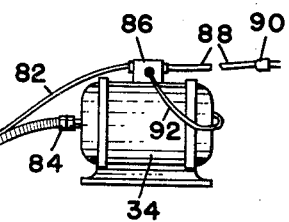
*INVENTOR.*
JOHN M. SWARTZENTRUBER

United States Patent Office 2,937,400
Patented May 24, 1960

2,937,400
DEHIDER
John M. Swartzentruber, R.R. 1, Greenwood, Del.
Filed Oct. 27, 1958, Ser. No. 769,729
4 Claims. (Cl. 17—21)

This invention relates to tools for separating the skin from the meat or body portion of animals, and particularly cattle, and in particular a pair of fluted rollers rotatably mounted in and extended from an end of a handle, with a knife also extended from the handle and positioned between the rollers, and wherein meshing gears are provided in the handle for driving one roller from the other and the roller driving the other roller is driven by a flexible shaft extended from the end of the handle opposite to the end from which the rollers and knife extend.

The purpose of the invention is to provide means for removing the hide from the carcass of an animal without mutilating either the hide or carcass and thereby substantially eliminating the possibility of contamination and damage to the hide or flesh of the animal.

Various types of knives and tools have been provided for removing the hide from the carcass of an animal, however, it is difficult to separate the hide from the carcass without damaging either the hide or carcass. With this thought in mind this invention contemplates a handle having a pair of fluted rollers rotatably mounted therein and extended from one end, a knife mounted in the handle and extended between the rollers, and transmission means in the handle and operatively connected to the rollers for operating the rollers.

The object of this invention is to provide a hide removing tool that is positioned between the hide and a carcass of an animal for working the hide away from the carcass.

Another object of the invention is to provide a hide removing tool that is designed to be held in one hand so that the hide may be drawn from the carcass with the other hand.

Another important object of the invention is to provide a hide removing tool having oppositely rotating fluted rollers in which the operating elements of the rollers are protected in a substantially sealed housing or casing.

A further object of the invention is to provide a hide removing tool including a knife in combination with fluted rollers in which the parts are removable and replaceable.

A still further object is to provide a hide removing tool having a knife blade in combination with rollers in which the tool is of a simple and economical construction.

With these and other objects and advantages in view the invention embodies a hollow handle having an enlarged end providing a gear case, spindles having fluted rollers on outer ends rotatably mounted in the gear case, meshing gears on the spindles and positioned in the gear case, a knife blade mounted in the end of the gear case and extended between the rollers, a flexible shaft extended into the gear case and operatively connected to the roller spindles, and a switch positioned in the handle for controlling a motor by which the flexible shaft is rotated.

Other features and advantages of the invention will appear from the following description taken in connection with the drawings, wherein:

Figure 1 is a plan view of the tool for removing hide from a carcass of an animal with one-half of the handle of the tool removed showing the gear assembly and switch.

Figure 2 is an end elevational view of the tool showing a hide in the act of being separated from a carcass of an animal.

Figure 3 is a wiring diagram showing a circuit for operating the motor of the device.

While one embodiment of the invention is illustrated in the above-referred-to drawings, it is to be understood that they are merely for the purpose of illustration and that various changes in construction may be resorted to in the course of manufacture in order that the invention may be utilized to the best advantage according to circumstances which may arise without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numerals 12 and 14 a pair of rollers having flutes 16 and 18 in the surfaces, numeral 20 one side of a casing having an enlarged end 22, numerals 24 and 26 spindles rotatably mounted in the enlarged end of the casing and on extended ends of which the rollers are mounted, numerals 28 and 30 gears mounted on and integrally connected to the spindles, numeral 32 a flexible shaft extended from the spindle 24 to a motor 34, and numeral 36 a switch actuated by a button 38 for completing a circuit to the motor for driving the rollers.

Numeral 40 indicates a blade or knife having sharp edges at the sides and the knife is positioned between and parallel to the rollers, as shown in Figure 1. The blade 40 is provided with a shank 42 that is held in a hub 44 on the outer surface of an end wall 46 of the enlarged portion of the casing by a thumb screw 48. The end wall 46 is also provided with hubs 50 and 52 in which bearings 54 and 56 for the spindles are secured, and the outer ends of the hubs 50 and 52 are provided with packing glands 58 and 60. The inner ends of the spindles are rotatably mounted in bearings 62 and 64 in inner hubs 66 and 68, respectively, and the hubs 66 and 68 are carried by a partition 70 at the inner end of the enlarged section 22 of the casing.

The casing includes two complementary sections secured together by bolts 72 extended through ears 74 on the sides of the sections. The sections of the casing are provided with webs 76 that provide a bearing for a coupling 78 by which the flexible shaft is connected to the spindle 24. The extended end of the casing, and the end opposite to the end on which the enlarged section is positioned is provided with a boss 80 through which the flexible shaft and a wire 82 from the switch 36 extend. The flexible shaft and wire are wrapped with a wire coil which extends through the boss.

The flexible shaft is connected to one end of the motor shaft by a coupling 84, and the wire 82 extends to a switch box 86 from which a conventional electric cord 88 with a plug 90 on the end thereof extends. The switch box is also provided with a cord 92, having wires 94 and 96 therein, which extend to the terminals of the motor, and as shown in Figure 3, the cord 88 is provided with wires 98 and 100, and the wire 82 with wires 102 and 104.

It will be seen that the tool is basically a movable hand tool and not a fixed mounted tool and so is free of rigid attachment to excessive weight thereby permitting substantially free movement of said tool when it is held in an operator's hand during dehiding. The flexible cable 32 is an attachment but not a rigid attachment whereby the tool can easily be moved along a stationary carcass.

*Operation*

In use the edge of the skin 106 is started to be separated from the flesh or body 108, and the rollers with the knife therebetween are worked in between the skin and body, as shown in Figure 2, whereby the skin is forced from the body without injury to the skin or hide, or to the carcass. This tool, therefore, not only facilitates separating a skin or side from a carcass, but makes it possible to remove a hide without damage to the hide or carcass.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it appertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts such as come within the purview of the invention claimed may be resorted to in actual practice, if desired.

Having now described the invention that which is claimed to be new and desired to be procured by Letters Patent, is:

1. A dehiding tool comprising a handle having an enlarged portion on one end, a pair of spaced parallel spindles rotatably mounted in the enlarged portion of the handle, meshing gears mounted on the spindles and positioned in the enlarged portion of the handle, a pair of rough surfaced rollers mounted on the spindles and extended from an end of the handle, and a knife blade mounted on the handle and extended between the rollers.

2. In a dehiding tool, the combination which comprises an elongated hollow handle, a pair of spaced parallel rollers having rough surfaces positioned at one end of the handle, spindles rotatably mounted in the handle and on which the rollers are positioned, a blade having a sharp edge mounted on the handle and extended between the rollers, a motor, and means operatively connecting the motor to the spindles for rotating the rollers.

3. In a dehiding tool, the combination which comprises an elongated handle having an enlarged end, spaced parallel spindles rotatably mounted in the enlarged end of the handle, meshing gears mounted on the spindles for rotating one spindle by the other, rollers having rough surfaces positioned on ends of the spindles extended from the handle, a boss positioned on the end of the housing from which the rollers extend, a knife blade mounted in the boss and secured therein by a thumb screw, a motor, a flexible shaft extended from one of the spindles to the motor whereby the motor rotates the spindles and rollers, and a switch positioned on the handle for completing a circuit to the motor.

4. In a dehiding tool, the combination which comprises an elongated handle, a pair of spaced parallel rollers having rough surfaces positioned at one end of the handle, a blade having a sharp edge mounted on the handle and extended between the rollers, a motor, and means operatively connecting the motor to the rollers for rotating the rollers and rotatably mounting said rollers on said handle, said tool being basically a movable hand tool and not a fixed mounted tool and so being free of rigid attachment to excessive weight thereby permitting substantially free movement of said tool when it is held in an operator's hand during dehiding for movement of the tool along a stationary carcass, the forward end of said knife protruding forwardly of a plane between the axes of said rollers.

References Cited in the file of this patent

UNITED STATES PATENTS

| | | |
|---|---|---|
| 1,847,536 | Pruefer | Mar. 1, 1932 |
| 2,624,445 | Wallman | Jan. 6, 1953 |
| 2,641,256 | Schmidt | June 9, 1953 |